July 18, 1950          A. P. FOX ET AL          2,515,208
WHEEL BEARING PACKER
Filed Nov. 5, 1946          5 Sheets-Sheet 3
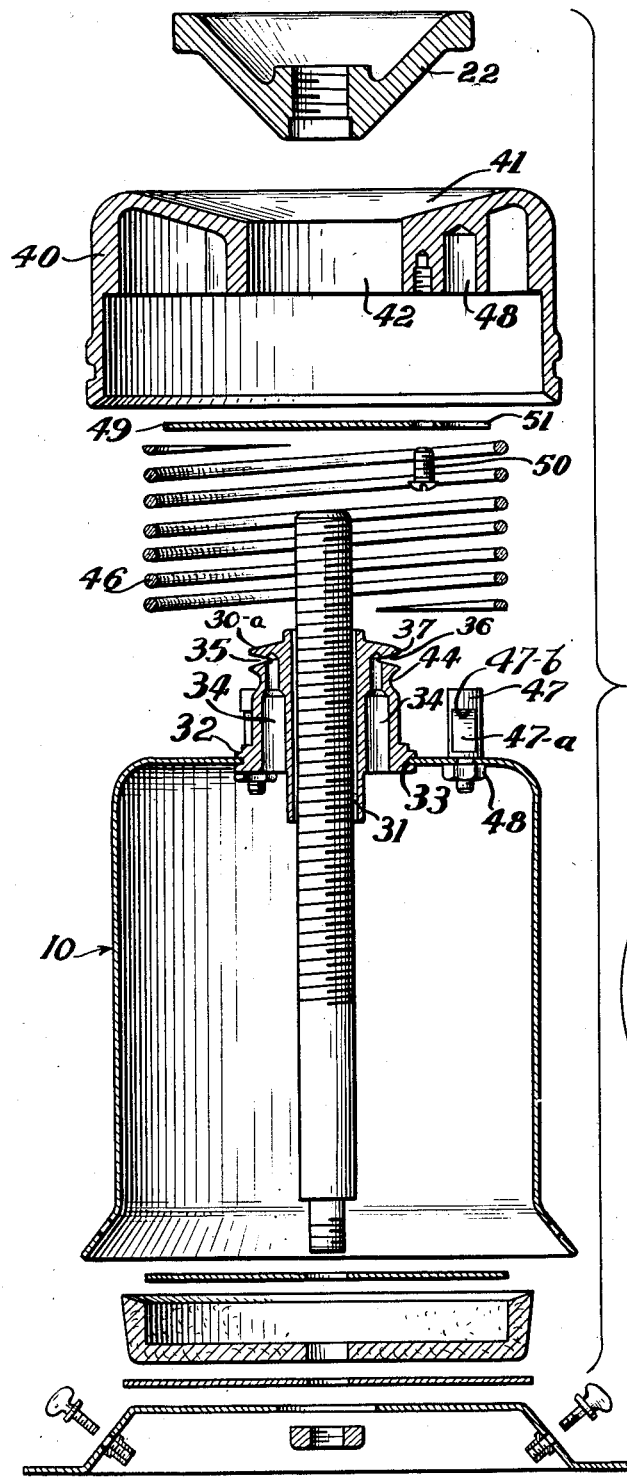
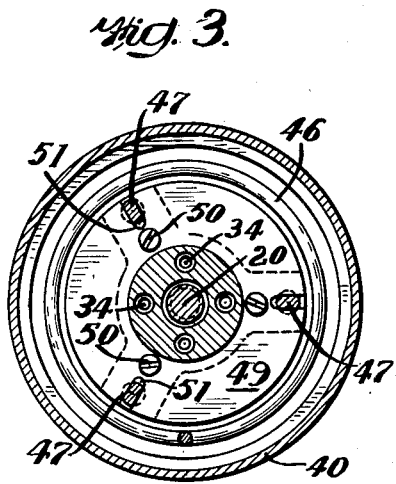
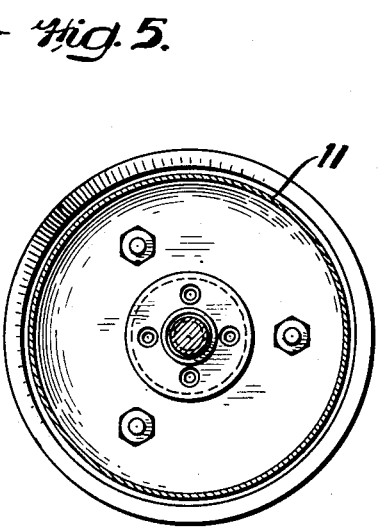
INVENTORS
A. P. Fox and
L. C. Rotter
BY
Leonard S. Kalish
Attorney

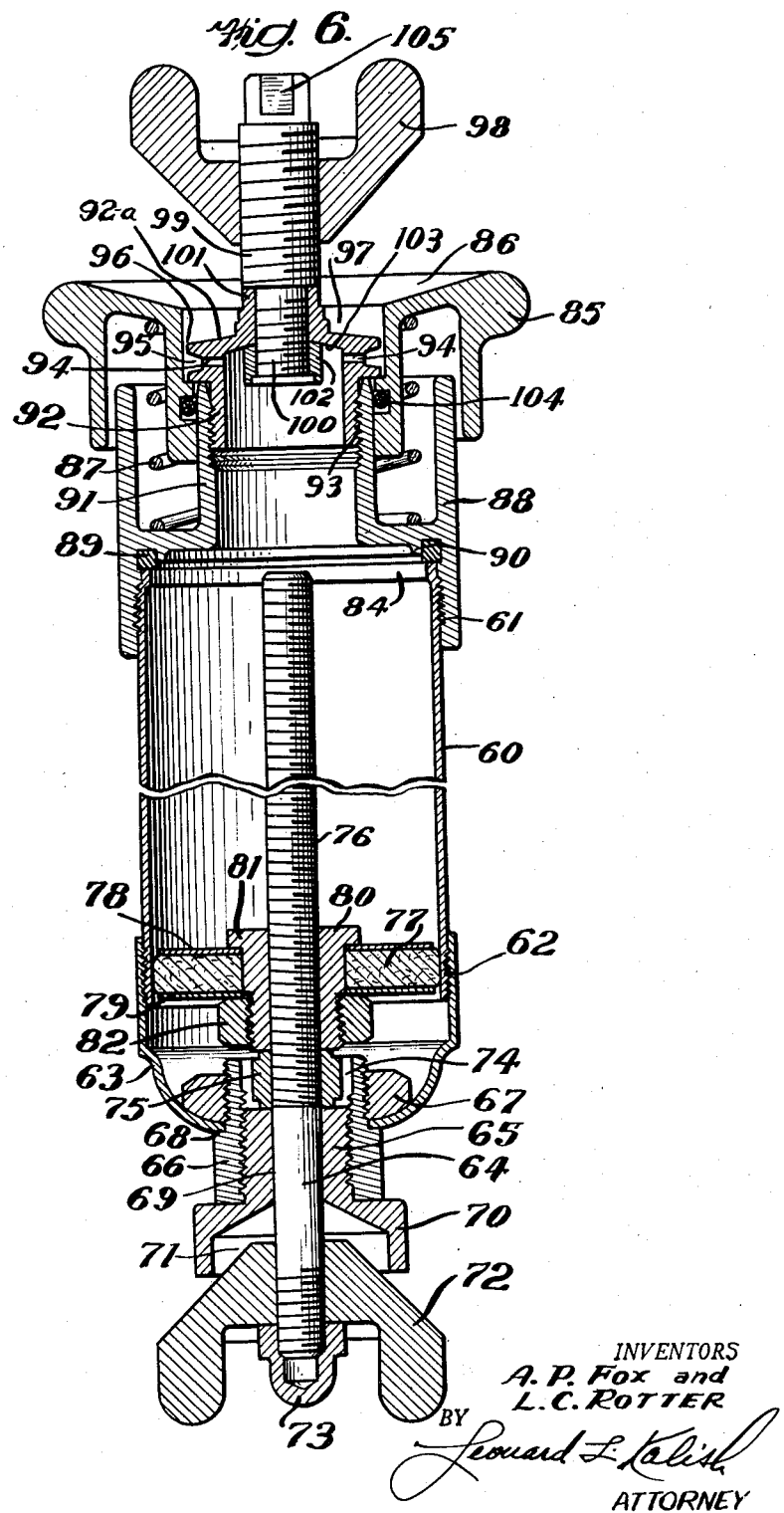

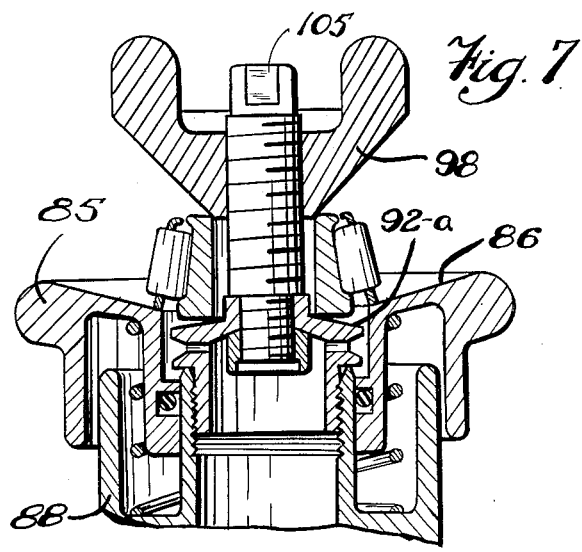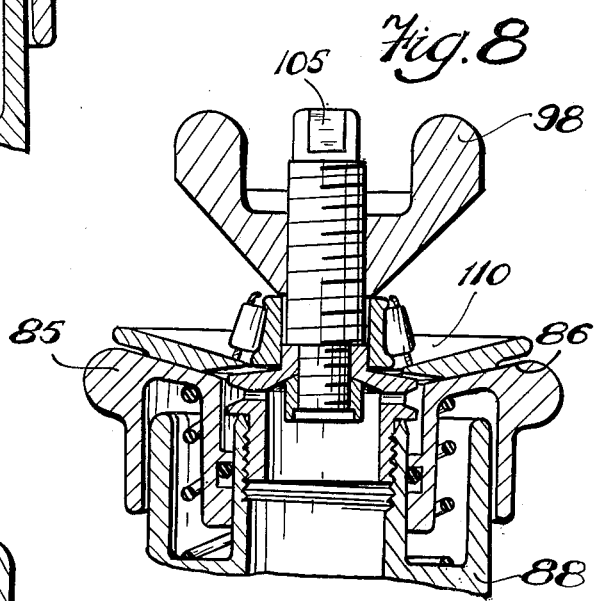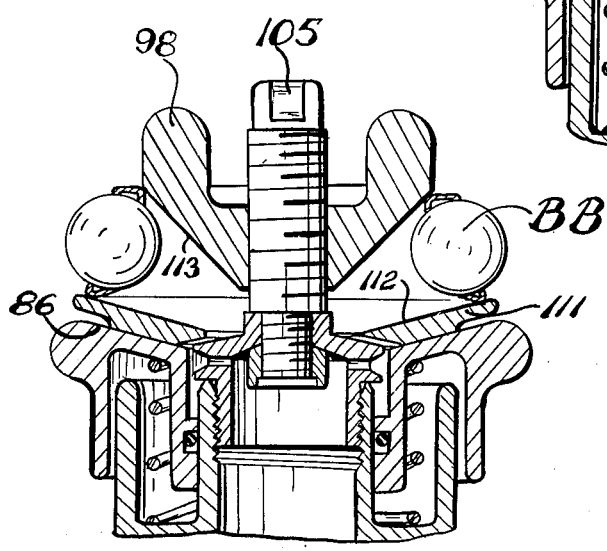

Patented July 18, 1950

2,515,208

UNITED STATES PATENT OFFICE 2,515,208

WHEEL BEARING PACKER

Alex P. Fox and Lutwin C. Rotter, St. Louis County, Mo., assignors to Lincoln Engineering Company, St. Louis, Mo., a corporation of Missouri Application November 5, 1946, Serial No. 707,928

9 Claims. (Cl. 184—1)

This invention relates to wheel bearing packers, that is, to devices for packing bearings with lubricant.

Among other objects, the invention aims to provide a device which will clamp the bearing and will force lubricant into it without the necessity of manually handling the bearing. Another object is to obviate manual handling of the lubricant so that it passes uncontaminated directly from the lubricant container into the bearing. Still another object is to provide means for clamping bearings which is adaptable to bearings of different sizes and types. Another object is to provide a device of the character indicated which will direct the lubricant to the particular part of the bearing adapted to receive it and will prevent the lubricant from flowing (during the packing operation) over parts of the bearing which should not be lubricated. Another object is to provide a device which makes the packing of a bearing a clean and easy job, yet accomplishes the work thoroughly.

Other objects and advantages will be understood from the following detailed description, appended claims and the accompanying drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In said drawings, in which like reference characters denote like parts throughout:

Figure 3 represents a cross-section on line 3—3 of Figure 1, but on a smaller scale.

Figure 4 represents a cross-section on line 4—4 of Figure 1, on the same scale as Figure 3.

Figure 5 is an exploded view, in longitudinal section, of the device of Figures 1-4, on the scale of Figures 3 and 4.

Figure 6 represents a longitudinal cross-sectional view of another embodiment of the present invention.

Figure 7 represents a fragmentary cross-sectional view of the embodiment of Figure 6 showing the appearance of the parts when an ordinary small bearing is being lubricated.

Figure 8 represents a view generally similar to that of Figure 7 but showing the use of a special adapter for extremely small bearings.

Figure 9 represents a view generally similar to that of Figures 7 and 8 but showing the use of a special adapter for lubricating ball bearings.

Figure 1:
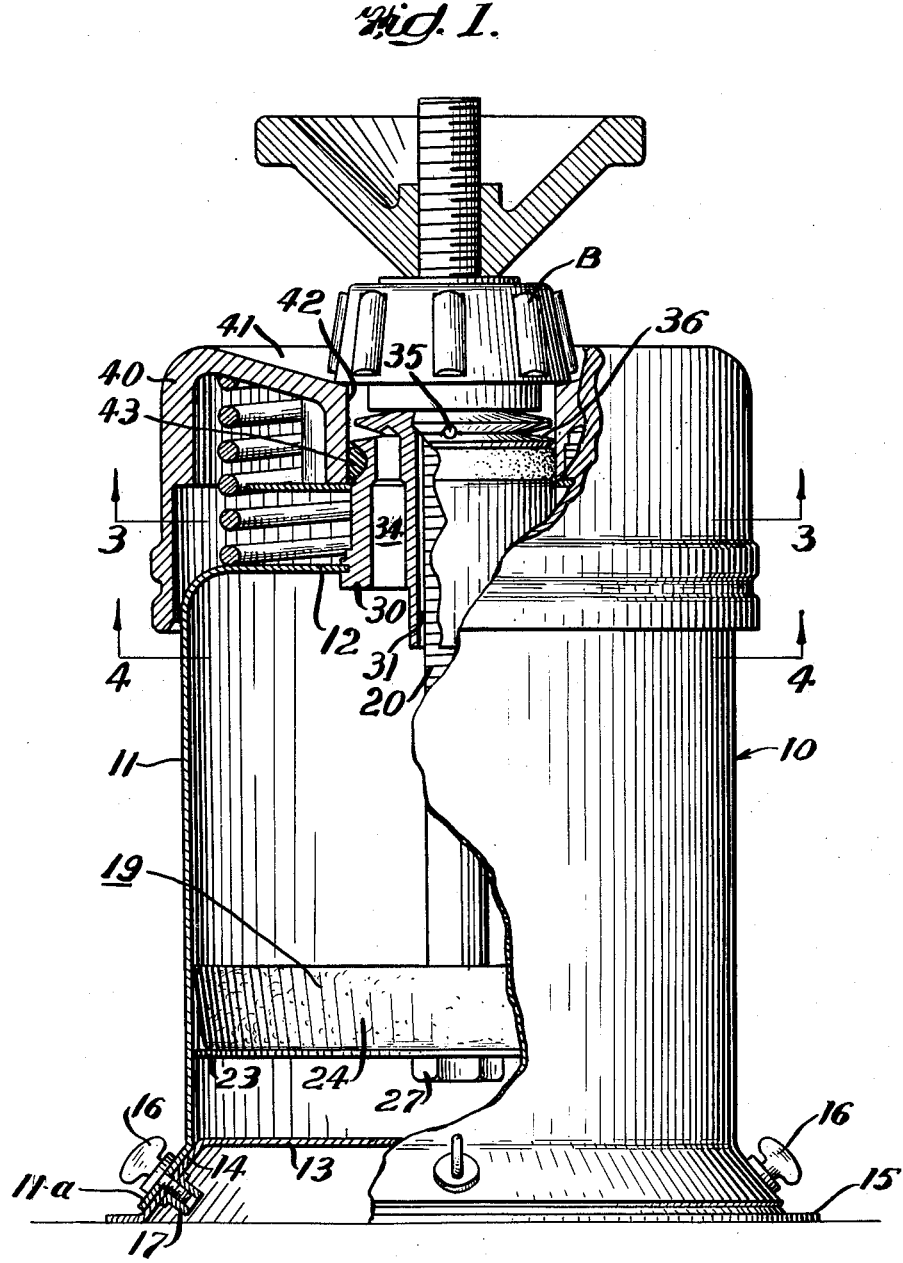
Figure 1 represents a view, partly in section and partly in elevation, of one embodiment of the present invention.

In Figures 1 to 5, there is shown one embodiment of the present invention which includes a lubricant container 10 which is a generally cylindrical body of metal or the like, with a partly closed top wall 12 integral with the side walls 11. At the bottom, the walls 11 are preferably flared outwardly as at 11ª, and a base member 13 is placed in the bottom to close the container and also to provide a stable base therefor. To this end, base member 13 may have an annular flange 14 adapted to lie contiguous to the flared skirt 11ª, and a circular end flange or pedestal 15 which is horizontal so as to rest flat on any ordinary support or surface. End flange 15 may be curled to provide a bead (not shown) if additional strength and resistance to battering are desired. Several thumb screws 16 may be passed through registering holes in the flared skirt 11ª and in the annular flange 14 and each thumb screw may engage the tapped bore of a thimble or boss 17 fixed to flange 14 on the inside of the base, so that the base member is rigidly secured to the container body but may be manually removed at any time to give access to the interior of the container body, as in refilling the same.

To force lubricant out of the upper end of the container, a piston 19 is reciprocable in the cylinder, being secured to the lower end of a piston-rod 20 whose upper end is threaded as at 21 for reception of a nut 22 which when turned moves the piston-rod and hence the piston up and down. As shown, the piston 19 consists of a metal disc 23, a cup leather 24 supported by disc 23 and in contact with the cylindrical walls of the container, and a metal disc 25 placed inside the cup leather to hold the shape of the latter. The assembly of disc 23, cup leather 24 and disc 25 is centrally perforated to permit the reduced, threaded end 26 of the piston-rod to pass therethrough. A nut 27 screws on reduced end 26 to clamp the piston assembly 19 upon the lower end of the piston-rod, yet to permit removal of the piston when renewal of the cup leather is necessary. A central perforation 28 (Figure 2) may be provided in base member 13 to permit the piston 19 to lie practically at the bottom of the container with the base member in place, which means that the capacity of the container is thereby increased. Perforation 28 also gives access to nut 27 from the outside of the body, permitting the piston-rod to be removed through the top if this is desired. The flared end of the body greatly facilitates moving the cup leather into the bottom of the body after the container has been filled with lubricant.

Secured to the top wall 12 of the container is an outlet or discharge member 30 in the form of a sleeve surrounding the piston-rod but having no connection with the threads 21. In order to emphasize this lack of connection a small space (whose size is exaggerated for clearness of illustration) is shown between the piston-rod and the bore 31 of the discharge member. The connection between the discharge member and the top wall 12 is rigid and may be detachable, as by means of flanges and bolts (not shown), or permanent as by securing the peripheral edge 33 of a central opening formed in said top wall 12 within an annular groove extending around the enlarged shoulder 32 formed at the lower end of the outlet member 30. The outlet member 30 has three or four bores 34 drilled lengthwise thereof parallel to the piston-rod, and a like number of lateral, tapered bores 35 extending radially and each intersecting one of the bores 34, so as to provide three or four lubricant channels or passageways each of which is open to the interior of the container and hence is fed lubricant when the piston moves upwardly therein. Under the relatively low pressures that obtain within the container, all the lubricant flows out through the passageways 34, 35 and none moves between the discharge member and the piston-rod. It will be apparent that the discharge of the lubricant from the passageways 35 is laterally outwardly. As shown in Figure 1, an annular groove or channel 36, which is V-shaped in cross section, extends around the periphery of the discharge member and receives all the lubricant flowing out of the passageways 35.

Figure 2:
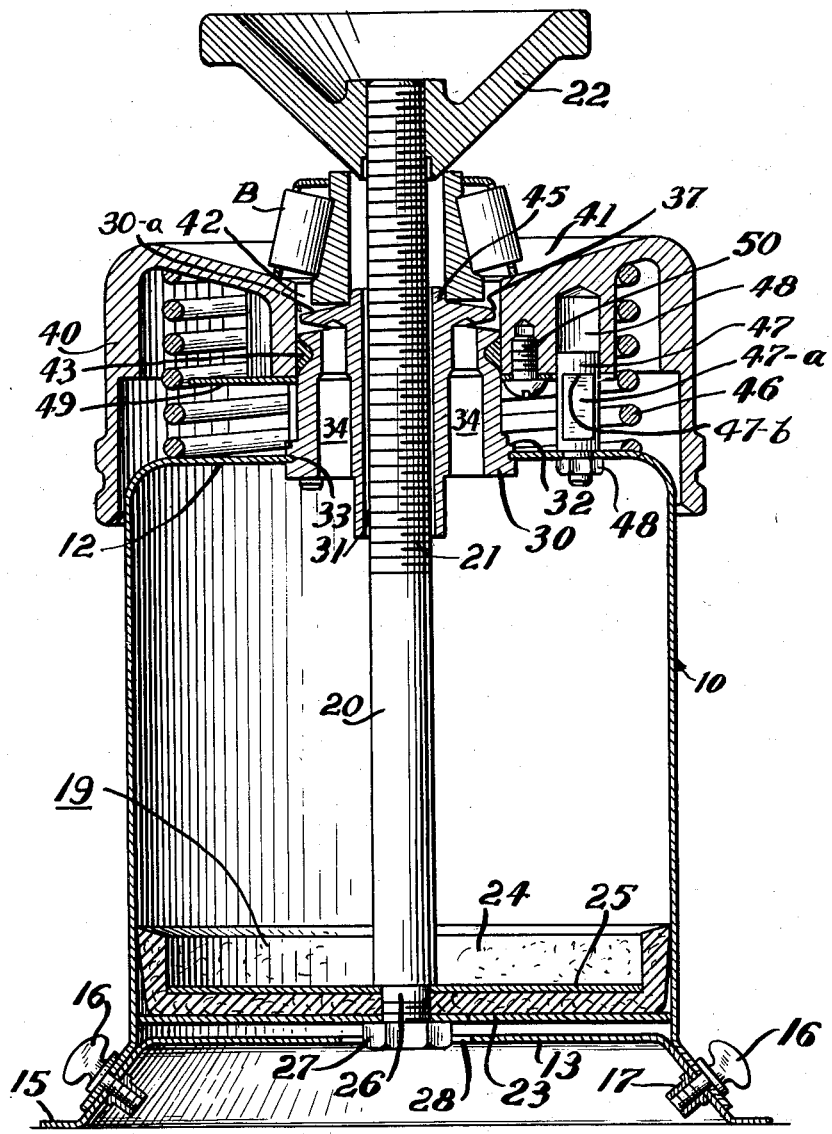
Figure 2 represents a longitudinal or vertical section of the embodiment of Figure 1.

To support the bearing B properly during the packing operation, also to provide an abutment against which the bearing may be clamped by nut 22, and to provide a guiding surface for directing the laterally discharged lubricant upwardly into the bearing, a packer assembly is mounted on the top of the container. The packer assembly includes a hollow shell 40 which embraces and is movable relative to the upper end of the container (but does not necessarily have any contact therewith), a centering wall 41 which is frusto-conical to center the bearing, plus a lubricant-guiding wall 42 which is cylindrical and of slightly larger diameter than the discharge member at the outlets of passageways 35, so that the laterally discharged lubricant will strike wall 42 and be turned upwardly into the bearing. It will be clear that the passageways 34, 35 together with the lubricant-guiding wall 42 and the upper end of the discharge member provide a plurality of lubricant conduits leading to the lower end of the bearing B. To prevent escape of the lubricant between wall 42 and the discharge member, a packing ring 43 is placed in an annular groove 44 (Figure 5) formed in the discharge member adjacent but below the discharge ends of passageways 35. Thus a seal is always maintained at this point, regardless of the position of shell 40 relative to the container. When centered by wall 41, the bearing B will rest in part on said wall and in part on the upper end of the discharge member, which has a circular end portion 45 snugly fitting in the central bore of the bearing (Figure 2). This arrangement inhibits the flow of lubricant into said central bore, which is undesirable as will be understood. However, any excess lubricant which flows out of the bearing onto the frusto-conical or re-entrant wall 41 will tend to flow or drain toward the center or in other words will not drip or flow over the top edge and sides of shell 40.

When bearings having larger inside diameters than the diameter of the portion 45 are being lubricated, the seal at the lower end of the central bore of the bearing is formed by the upper frusto-conical wall 30—a of the discharge member 30; in such cases, a clearing being provided between the bearing and the portion 45 in a manner similar to that shown in Figure 7.

To hold shell 40 yieldingly so that it aids in a resilient clamping of the bearing, a compression coil spring 46 is interposed between top wall 12 and the underside of shell 40. Nut 22 directly engages and in fact enters the top of the bearing B (Figure 2) and clamps the latter down against the frusto-conical wall 41, hence acts against the spring 46. If there is practically no resistance to upward movement of the piston, i. e., if the container is empty, the spring will not be compressed, but if the container is filled with a heavy grease, as nut 22 is tightened against the bearing the entire shell 40 may move downwardly to an extent which depends upon the strength of the spring, the physical constants of the lubricant, the manner in which the lubricant is packed in the container, and other factors. With the parts designed as shown, a piston travel of only about $\tfrac{1}{16}$ inch is necessary to force enough lubricant upwardly to pack the average bearing.

It is, of course, obvious that when the nut 22 is tightened upon the threaded portion 21 of the piston-rod 20, the bearing B is forced down against the discharge member 30 and prevents flow of lubricant into the central bore of the bearing, thereby eliminating waste of lubricant. With the bearing B making a seal against the discharge member 30 (either at the end portion 45 or at the frusto-conical surface 30—a), the position of shell 40 is automatically adjusted to one at which the frusto-conical surface 41 seals against the bearing and remains sealed regardless of variations in spring pressure, etc.

Three or more studs 47 are fastened to the top wall 12 by nuts 48 and extend upward therefrom and into vertical bores 48 formed in said shell 40. A pair of flats 47—a are milled on opposite sides of each stud 47; the flats 47—a terminating short of the upper end of said studs 47 to provide upper shoulders 47—b.

A washer 49 is fastened by screws 50 to the underside of shell 40 and is provided with a plurality of slots or notches 51 adapted to fit over the milled intermediate portions of the studs 47. This retains the shell 40 in non-rotating position relative to the top wall 12 and also provides an upper limit of movement for said shell; the shell being capable of moving upward under the force of the spring 46 only to the point at which the washer 49 contacts the shoulders 47—b of the studs 47.

Since the operation has been largely explained in the foregoing, but little need be added. As nut 22 is turned down against the bearing, it enters the inner race of the bearing and forces said race down against the seat provided therefor on the upper end of the discharge member, At the same time the shell of the bearing is forced at one end against the inner race of the bearing and at the other end against the upper face or wall 41. This prevents the bearing from rotating. As the piston-rod is moved upwardly, the piston is lifted to push against the lubricant and the latter (even if a heavy grease) is forced to flow through the conduits in the discharge member and out through and around the peripheral groove 36, past the annular lip 37 formed at the top of the discharge member and up into the bearing, the lubricant being in the form of a hollow tube or ribbon. This hollow tube or ribbon of lubricant cannot go elsewhere than into the interior of the bearing, which is accordingly completely packed with lubricant. The clearance between lip 37 and the cylindrical wall 42 is very small and is exaggerated in the drawings.

In Figure 6 there is shown another embodiment of the present invention employing two nuts, one to clamp the bearing, and the other to serve as a handle for the piston in order to force lubricant out of the container and into the bearing. The container is shown at 60 and is a straight tube with screw threads 61, 62 on the outside at opposite ends. An end member 63 is screwed on threads 62 and is connected to piston-rod 64 by means of a bushing 65 and a lock nut 67 threaded on nut 66. Lock nut 67 engages the end member 63 on the inside so as to clamp the end member against a circular shoulder 68 on nut 66 outside of the end member. Piston-rod 64 is rotatable in a bore 69 in bushing 65. The outer end of the bushing has an enlarged head 70 with a recess 71 adapted to receive part of a wing-nut 72 fixed by a nut 73 to the threaded extremity of the piston-rod 64. Nut 66 extends beyond lock nut 67 on the inside of the container and provides a recess 74 for the reception of a stop 75, here in the form of a nut which is turned tight on the end of threads 76 on the piston-rod, hence is rotatable with the piston-rod. The stop-nut 75 prevents any outward travel of the piston-rod relative to the container, while inward travel is obviated by engagement of the wing-nut or handle 72 with recess 71. A piston consisting of a disc 77 of packing material, backed on each face by metal discs 78, 79, is reciprocable in the container because it has a central nut 80 engaging the threads 76. Nut 80 has a shoulder 81 engaging one of the discs 78, and a lock nut 82 is threaded on nut 80 to tighten and unify the assembly of the discs 77, 78, 79, which together make up the piston. Packing disc 77 has a sliding fit in the cylindrical container but is grease-tight. The described piston will travel almost the entire length of the container to expel nearly its entire contents, when wing-nut 72 is used as a handle to rotate the piston rod in the proper direction. To prevent the piston from running off the end of the thread on the piston-rod, the opposite end of the container may have a piston-step in the form of a bead or flange 84, which may be formed by spinning or otherwise.

At the same end of the container, a bearing-supporting member 85 (generally like member 40) having a frusto-conical upper face 86 is supported by a compression coil spring 87 whose other end is received in a discharge member 88. Here the discharge member 88 closes the end of the container and is screwed on threads 61, with a packing ring 89 to seal the joint. Packing ring 89 may be held in place by a circular lip 90. At its center the discharge member 88 has a tubular extension 91 providing part of a lubricant conduit which is relatively large. A second discharge member 92 is screwed as at 93 to the inside walls of tubular extension 91 so as to be rigidly secured thereto. The lubricant flows out through several radial bores or passageways 94 which discharge into a peripheral or annular groove or channel 95 which is like the groove or channel 36. The circular lip 96 on discharge member 92 has a small clearance inside of cylindrical wall 97 (on the bearing-supporting member 85) to permit the previously described tube or ribbon of lubricant to flow outwardly and into the bearing, not shown. The bearing is clamped by a wing-nut 98 threaded on a screw threaded shaft 99 which is rigidly secured to the discharge member 92, for instance by means of a reduced screw threaded end 100 engaged with threads in a boss 101 integral with discharge member 92. A lock nut 102 on the reduced end 100 bears against the underside of the end wall 103 of the discharge member. Turning of wing-nut 98 will therefore not effect turning of shaft 99 or the discharge member 92. A packing ring 104, which is of the "free floating" type, may provide a lubricant seal between the movable bearing-support 85 and the stationary tubular extension 91 of the discharge member 88. Shaft 99 is removed when desired by turning its milled, flattened outer end 105 by means of a wrench, after removing lock nut 102. The embodiment of Figure 6 is a portable unit, is a little more rugged than the form of Figure 1 and is not quite as sensitive to movements of the nut, but basically it is the same.

In Figure 8 there is shown a further modification of the embodiment of Figures 6 and 7 wherein a dished frusto-conical adapter 110 is provided intermediate the face 86 and the bearing, where extremely small size bearings are employed. That is, where bearings so small that they do not extend beyond the surface 92—a are employed, it is obvious that no outer seal could be made between the bearing and the face 86. To overcome this, the adapter 110 is constructed so that its upper frusto-conical sealing surface extends inwards beyond the face 86 and permits contact with the outer edge of even small-size bearings, as indicated in Figure 8.

In Figure 9 there is shown a further modification of the embodiment of Figures 6 and 7 which permits lubrication of ball-bearings. In this embodiment, a dished adapter 111 is mounted upon the face 86 to provide an upper frusto-conical surface 112 which converges inwardly relative to the tapered surface 113 of the nut 98 so as to permit lubrication of a full range of different-size ball-bearings BB. Since these ball-bearings do not have the central bore which forms part of roller bearings, tightening of the nut 98 results in clamping of the ball-bearing intermediate said nut and the adapter 112; centering being provided by the surface 113 of the nut 98.

Figure 7 shows the upper end of the embodiment of Figure 6 as it appears when a conventional small bearing is being lubricated; it being apparent that the inner bore of the bearing is sealed against flow of lubricant thereinto by the frusto-conical surface 92—a of the discharge member 92 so that lubricant is forced only into the roller mounting portion of the bearing.

Fom the foregoing description, it is apparent that the novel wheel bearing packer of the present invention permits the prompt and effective lubrication of wheel bearings or the like, without waste of lubricant resulting from filling up of the central bore in the bearing and thereby affords substantial commercial advantages over wheel bearing packers heretofore employed, wherein considerable lubrication was usually wasted by being introduced into the central bore of the bearings, where it is not needed.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described our invention, what we claim as new and desire to protect by Letters Patent is:

1. Apparatus for packing bearings with lubricant including a lubricant-container, a lubricant-expelling piston reciprocable in the lubricant-container, a piston-rod secured to the piston and having screw threads on one end thereof, a nut threaded on said screw threads, a bearing-supporting member, a compression coil spring interposed between the bearing-supporting member and that end of the container towards which the piston moves to discharge lubricant, said bearing-supporting member embracing and movable relative to said container end, the nut being adapted to clamp a bearing against the bearing-supporting member, and conduit means to conduct lubricant from the interior of the container through the bearing-supporting member to a bearing clamped thereon.

2. Apparatus for packing bearings with lubricant including a lubricant-container, a lubricant-expelling piston reciprocable in the lubricant-container, a piston-rod secured to the piston and extending outside of the container having screw threads on the end which is outside of the container, a nut threaded on said screw threads, a discharge member having lubricant conduits therethrough and fixed to the lubricant-container with said conduits open to the interior of the container, said discharge member being principally outside of the container and having means on its outer end for fitting into the central bore of a bearing, and a bearing-supporting member surrounding the discharge member and having a central cylindrical wall providing lubricant-guiding means and so disposed as to receive all lubricant discharged from said conduits by pressure from said piston; the nut and bearing-supporting member together clamping the bearing which is to be packed.

3. Apparatus for packing bearings with lubricant including a lubricant-container, a lubricant-expelling piston reciprocable in the lubricant-container, a piston-rod secured to the piston and extending outside of the container and having screw threads on the end which is outside, a nut threaded on said screw threads and adapted to engage a bearing, a discharge member having lubricant conduits extending therethrough and having a central bore through which the piston-rod passes, means securing the discharge member at one end to the container so that the conduits are open to the interior of the container, the other end of the discharge member being outside of the container and having a peripheral V-shaped groove or channel into which the conduits discharge, and a bearing-supporting member surrounding the discharge member and having a central cylindrical wall which is close to the peripheral groove or channel but is sufficiently spaced from the discharge member to permit a tubular ribbon of lubricant to travel along the cylindrical wall and into a bearing on the bearing-supporting member.

4. Apparatus for packing bearings with lubricant including a lubricant-container, a lubricant-expelling piston reciprocable in the lubricant-container, a piston-rod secured to the piston and extending outside of the container and having screw threads on the end which is outside, a nut threaded on said screw threads, a discharge member fixed to the container with the screw threaded end of the piston-rod passing therethrough, conduits in said discharge member which are open to the interior of the container, a hollow shell adapted to support a bearing and having one end embracing and movable over the container and having a central cylindrical wall which embraces the discharge member, joint packing between the discharge member and the central cylindrical wall to permit the hollow shell to slide relative to the container and the discharge member but to prevent undesirable flow of lubricant, and a compression coil spring within the hollow shell and bearing at one end against the container and at the other end against an inside wall of the hollow shell, said spring yielding to pressure from the nut when screwed down against a bearing supported on said hollow shell.

5. Apparatus for packing bearings with lubricant including a lubricant-container, a lubricant-expelling piston reciprocable in the lubricant-container, a piston-rod secured to the piston and extending outside of the container and having screw threads on the end which is outside, a nut threaded on said screw threads, a discharge member fixed to the container with the screw threaded end of the piston-rod passing therethrough, conduits in said discharge member which are open to the interior of the container and which discharge laterally outwardly, a hollow shell adapted to support a bearing and having one end embracing and movable over the container and having a central cylindrical wall which slidingly embraces the discharge member, a compression coil spring within the hollow shell and bearing against said shell and against the container to tend to hold the shell spaced from the container except at said embracing end, said spring yielding to pressure from the nut when screwed down against a bearing supported on said hollow shell, displacement of the piston by the nut effecting flow of lubricant through said conduits and out against the cylindrical wall of the hollow shell, the bearing being so supported by the hollow shell as to receive all the lubricant flowing out of the conduits and past said cylindrical wall.

6. Apparatus for packing bearings with lubricant including a lubricant-container, a lubricant-expelling piston reciprocable in the lubricant-container, a piston-rod secured to the piston and extending outside of the container and having screw threads on the end which is outside, a nut threaded on said screw threads, a discharge member fixed to the container with the screw threaded end of the piston-rod passing therethrough, conduits in said discharge member which are open to the interior of the container and which discharge laterally outwardly, a hollow shell adapted to support a bearing and having one end embracing and movable over the container, a compression coil spring within the hollow shell and bearing against it and the container to tend to hold the shell spaced from the container except at said embracing end, said spring yielding to pressure from the nut when screwed down against a bearing supported on said hollow shell, displacement of the piston by the nut effecting flow of lubricant through and out of said conduits into the bearing, and means secured to the container and having sliding engagement with the hollow shell to permit movement of the hollow shell relative to the container but to prevent rotation of the hollow shell.

7. Apparatus for packing bearings with lubricant comprising a generally cylindrical lubricant container, a lubricant-expelling piston movably mounted within said container, means for manually moving said piston within said container thereby to drive lubricant therefrom under pressure, a sealing member axially telescopically mounted adjacent the discharge end of said container, said sealing member being normally spring-urged to outermost extended position and having a frusto-conical sealing face adapted to make contact with the outer periphery of a bearing or the like, a fixed annular sealing surface disposed centrally of said sealing face with a peripheral lubricant passageway formed therebetween, said fixed annular sealing surface being adapted to contact and close off the central bore of the bearing and an adjustable bearing clamp adapted to make centering contact with the opposite end of said bearing and to force it firmly against said fixed annular sealing surface and also against the frusto-conical sealing face and to move said sealing member to retracted position, thereby to permit lubricant to be forced into said bearing during operation of said piston.

8. In a wheel bearing packer for filling roller bearings or the like, a telescopically mounted sealing member normally spring-urged to outermost extended position and having an annular frusto-conical sealing surface adapted to make contact with the outer periphery of a bearing to be lubricated, a fixed annular sealing surface disposed centrally of the annular sealing surface of said member, said inner sealing surface being adapted to contact and close off the central bore of said bearing, an adjustable nut adapted to be tightened against the opposite end of said bearing thereby to force said bearing against said fixed inner sealing surface and also against said sealing member thereby to move said sealing member to retracted position, and means for forcing lubricant under pressure into the annular space intermediate the peripheral zones of contact of said bearing with said frusto-conical sealing surface and with said fixed inner sealing surface, thereby to force said lubricant into the roller-mounting portion of said bearing without entering the central bore of said bearing.

9. In a wheel bearing packer for filling roller bearings or the like, a generally cylindrical lubricant container, a lubricant-expelling piston movably mounted within said container, a piston-rod connected to said piston and protruding from one end of said cylindrical container, an operating handle mounted upon the protruding end of said piston-rod to permit manual movement of the piston within said cylindrical container, a discharge member mounted upon the other end of said container and having a fixed annular sealing surface, an axially-movable member mounted upon said discharge member in telescopic relationship thereto, said movable member being normally spring-urged to axially outermost position relative to said discharge member and having an annular frusto-conical sealing surface, said frusto-conical sealing surface being somewhat radially spaced from the fixed annular sealing surface to provide an annular lubricant passageway communicating with said lubricant container, and an adjustable bearing clamp mounted upon said discharge member and constructed and arranged to make centering contact with the opposite end of the bearing and to force it axially inward, whereby the fixed annular sealing surface is maintained in fluid-tight contact with the inner periphery of the bearing so as to close off the central bore of the bearing and whereby the frusto-conical sealing surface is maintained in resiliently yielding fluid-tight contact with the outer periphery of the bearing.

ALEX P. FOX.
LUTWIN C. ROTTER.

REFERENCES CITED

The following references are of record in the file of this patent:

UNITED STATES PATENTS

| Number | Name | Date |
| --- | --- | --- |
| 1,024,673 | Bowen | Apr. 30, 1912 |
| 1,283,628 | Beach | Nov. 5, 1918 |
| 2,168,746 | Saal | Aug. 8, 1939 |
| 2,187,608 | Kropp | Jan. 16, 1940 |
| 2,396,124 | Pitisci | Mar. 5, 1946 |

FOREIGN PATENTS

| Number | Country | Date |
| --- | --- | --- |
| 495,468 | Great Britain | Feb. 8, 1937 |